| United States Patent Office | 3,444,101 |
|---|---|
| | Patented May 13, 1969 |

3,444,101
BARIUM TITANATE COMPOSITIONS CONTAINING CERIUM AND BISMUTH
Konrad Viernickel, Nuremberg, Germany, assignor to Telefunken Patentverwertungsgesellschaft m.b.H., Ulm (Danube), Germany
No Drawing. Filed Aug. 18, 1965, Ser. No. 480,790
Claims priority, application Germany, Aug. 19, 1964, T 26,846
Int. Cl. H01b 1/08
U.S. Cl. 252—520      2 Claims

ABSTRACT OF THE DISCLOSURE

An electrically conductive ceramic product consisting essentially of 0.02–0.2 part by weight of $Bi_2O_3$ and 99.8–99.98 parts by weight of a titanate of the formula $(Ba_{0.9990-0.9960}, Ce_{0.001-0.004})Ti_{1.00-1.01}O_3$. The ceramic product is made by a process for the production of an electrically conductive ceramic product, which process comprises the steps of: admixing barium and cerium titanates to form an over-all titanate composition of the formula $(Ba_{0.9990-0.9960}, Ce_{0.001-0.004})Ti_{1.00-1.01}O_3$; admixing to the resultant mixture 0.02–0.2% by weight of $Bi_2O_3$, and baking the resultant mixture at 1280–1350° C.

---

The present invention relates to electrically conductive barium titanates containing cerium and bismuth.

More particularly, the present invention relates to an electrically conductive ceramic consisting essentially of barium titanate with minor quantities of cerium and bismuth, as well as to a process for making such ceramic.

Barium titanate is a well-known dielectric material, and has been employed in a wide variety of applications in the electronics industry. In the periodical, "Industrial and Engineering Chemistry," 47, 1611–20 (1955), there is disclosed that the addition of cerium to barium titanate results in a decrease in the dielectric strength of the material. It is also known that less than 10% of cerium oxide can be added to barium titanate in order to provide a dielectric with a finer structure. In such prior art compositions, the cerium is necessarily present in its tetravalent form owing to the fact that the barium titanate is conventionally baked in a strongly oxidizing atmosphere. Thus, in such processes, the resultant article does not exhibit a sufficient electrical conductivity for it to be useful as a semiconductor in most industrial applications.

In order to obtain an electrically conductive ceramic material on the basis of barium titanate, the ceramic material can either be reductively baked, or doped with trivalent or pentavalent elements having approximately the same atomic radius as the barium or the titanium ion. By the doping technique, the added elements replace the $Ba^{2+}$ or the $Ti^{4+}$, respectively, in the $BaTiO_3$ lattice, while a corresponding number of $Ti^{4+}$ ions jump into the trivalent stage and thus cause a semiconductor mechanism.

Whereas a relatively high conductivity is obtained by doping a $BaTiO_3$ cermaic material with cerium, there is the disadvantage that the conductivity is greatly dependent upon the atmosphere in the oven. This is the case because cerium under an oxidizing atmosphere is easily converted into its tetravalent form whereby a non-conductive ceramic system is obtained.

With respect to the possible utilization of other doping elements, on the one hand, some elements, such as for example Ta or Nb, exhibit too low a conductivity, while on the other hand others, such as Bi, Sb, As exhibit too high a vapor pressure at the baking temperature. These high vapor pressures result in difficulty reproducible materials inasmuch as differences in oven operation lead to ceramic materials having variable quantities of doping elements, irrespective of the fact that identical starting materials are used. This problem is also compounded by the fact that the oven and its atmosphere are contaminated by the vapors of the doping elements.

With respect to bismuth in particular, it was found that a barium titanate ceramic material having an addition of up to 0.1% by weight of $Bi_2O_3$ did not exhibit any conductivity for all practical purposes. Only a larger addition of up to 0.15% by weight of $Bi_2O_3$ produced a conductivity value of about 500–1000 Ωcm., which, however, fluctuated widely in tests of separate samples from the same batch.

An object of this invention, therefore, is to provide barium titanate-based materials having improved and reproducible electrical conductivities.

A further object is to provide a process wherein it is feasible to control the electrical conductivity of a barium titanate material so that it can be tailor-made for each application.

Upon further study of the specification and appended claims, other objects and advantages of this invention will become apparent.

To attain the objects of this invention, an electrically conductive ceramic product is provided which contains a predominant proportion of barium titanate which is doped with cerium, and to which is added a quantity of 0.02–0.2% by weight of bismuth oxide based on the weight of the total mixture.

It is indeed surprising that by the addition of very small amounts of bismuth compounds to a mass doped with cerium, narrowly defined values of the conductivity of the ceramic material are obtained, even if the baking conditions vary considerably. Furthermore, owing to the very small quantity of bismuth in the ceramic, the oven atmosphere is not contaminated even after a long period of time. As a possible explanation of the underlying mechanism of this invention, the addition of bismuth stabilizes the cerium in its trivalent form and concomitantly prevents it from being converted to its tetravalent form.

The production of the conductive ceramic is suitably conducted in such a manner that barium titanate (or compounds forming barium titanate upon baking) and cerium titanate (or compounds forming cerium titanate upon baking) are mixed with 0.02 to 0.2%, preferably 0.06 to 0.12% by weight of $Bi_2O_3$. The molar ratio of barium titanate to cerium titanate is 99.9 to 99.6 molar percent $BaTiO_3$ and 0.1 to 0.4, preferably 0.15 to 0.25 molar percent cerium titanate. The mixture is then baked in an oxidizing atmosphere, for example air, at about 1280 to 1330° C., for 1300° C. to 1320° C., and preferably 20 to 30 minutes, if there is wanted a small range of DC-voltage-dependence and preferably 40 to 60 minutes if a larger range is wanted.

The final products exhibit Ωcm. values of about 50 to 500, preferably 50 to 100.

It is noted that the percentage of bismuth in the final product remains from 0.02–0.2% of the total mixture. In the final product the structure of the barium titanate shall have the Perovskite-structure.

Starting products are especially the oxides of titanium and bismuth, the carbonate of barium and the oxalate of cerium.

The purity of the starting products are better than 99%.

The impurities shall not be elements of their compounds with three or one valencies, the ionic-radius of them are in the range of the ionic-radius of titanium respectively barium.

The conductivity can be controlled within certain limits by the addition of $Bi_2O_3$, as well as by the baking time and temperature. Thus, it is possible, for example, to increase the conductivity by using a high baking temperature and/or a long residence time, with a larger amount of $Bi_2O_3$ being added. Conversely, it is possible to decrease the conductivity when adding smaller quantities, for example less than 0.1% by weight.

The electrically conductive ceramic provided by this invention is particularly suitable as a cryogenic conductor. The ceramic can also be used, within certain limits, for barrier layer capacitors, the barrier layers being formed between the core of the ceramic material and the mounted metallic electrodes.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

Example 1

Barium titanate and cerium titanate were admixed to form an over-all titanate composition of the formula $(Ba_{0.9975}, Ce_{0.0025})Ti_{1.00-1.01}O_3$. To this mixture was added 0.03% by weight, based on the weight of the total mixture of $Bi_2O_3$. The resultant mixture was then baked at 1310° C. for 20 minutes. The resultant product had an $\Omega$cm. value of 140, measured at 25° C.

Example 2

Example 1 was repeated except that 0.06% by weight of $Bi_2O_3$ was added, the resultant product having an $\Omega$cm. value of 70.

Example 3

Example 1 was repeated except that 0.1% by weight of $Bi_2O_3$ was added, the resultant product having an $\Omega$cm. value of 55.

Example 4

Example 1 was repeated except that 0.15% by weight of $Bi_2O_3$ was added, the resultant product having an $\Omega$cm. value of 95.

In view of the given examples it is to be seen that with increasing contents of $Bi_2O_3$ the value of $\Omega$cm. first decreases and, as the $Bi_2O_3$ content is still further increased, the $\Omega$cm. value suddenly increases.

It is possible that this effect relates to the differential insertion of the bismuth into the crystal-lattice.

The preceding examples can be repeated with similar success by substituting the generically and specifically described reactants and operating conditions of this invention for those used in the preceding examples.

It will be understood that the above description of the present invention is susceptible to various modifications, changes, and adaptations, and the same are intended to be comprehended within the meaning and range of equivalents of the appended claims.

What is claimed is:

1. An electrically conductive ceramic product consisting essentially of 0.02–0.2 part by weight of $Bi_2O_3$ and 99.8–99.98 parts by weight of a titanate of the formula $(Ba_{0.9990-0.9960}, Ce_{0.001-0.004})Ti_{1.00-1.01}O_3$.

2. A process for the production of an electrically conductive ceramic product, which process comprises the steps of:
 (a) admixing barium and cerium titanates to form an over-all titanate composition of the formula $(Ba_{0.9990-0.9960}, Ce_{0.001-0.004})Ti_{1.00-1.01}O_3$;
 (b) admixing to the resultant mixture 0.02–0.2% by weight of $Bi_2O_3$; and
 (c) baking the resultant mixture at 1280–1350° C.

References Cited

UNITED STATES PATENTS

| 2,976,505 | 3/1961 | Ichikawa | 252—520 XR |
| 3,350,212 | 10/1967 | Fujiwara | 252—520 XR |
| 3,352,697 | 11/1967 | Fujiwara | 252—520 XR |

FOREIGN PATENTS 929,350  6/1955  Germany.

HERBERT B. GUYNN, *Primary Examiner.*

J. D. WELSH, *Assistant Examiner.*

U.S. Cl. X.R.

106—39; 252—62.9, 521; 338—22